H. VON PHUL, Jr. & J. MALLON.
Sugar-Cane Stubble-Diggers and Cultivators.

No. 157,893. Patented Dec. 15, 1874.

WITNESSES:

INVENTOR:
H. Von Phul, Jr.
J. Mallon
BY
ATTORNEYS.

UNITED STATES PATENT OFFICE.

HENRY VON PHUL, JR., AND JAMES MALLON, OF HOLLY WOOD, LA.

IMPROVEMENT IN SUGAR-CANE-STUBBLE DIGGERS AND CULTIVATORS.

Specification forming part of Letters Patent No. 157,893, dated December 15, 1874; application filed July 25, 1874.

*To all whom it may concern:*

Figure 1:
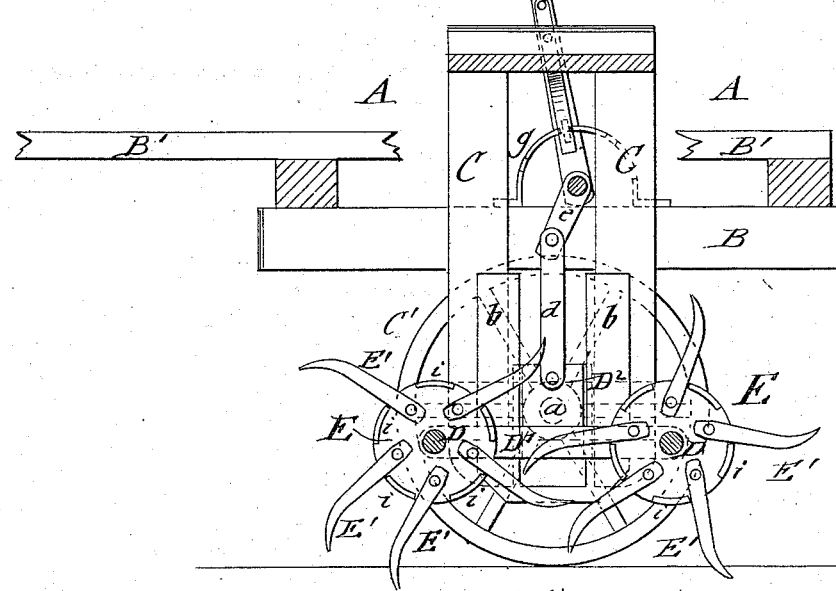
Figure 2:
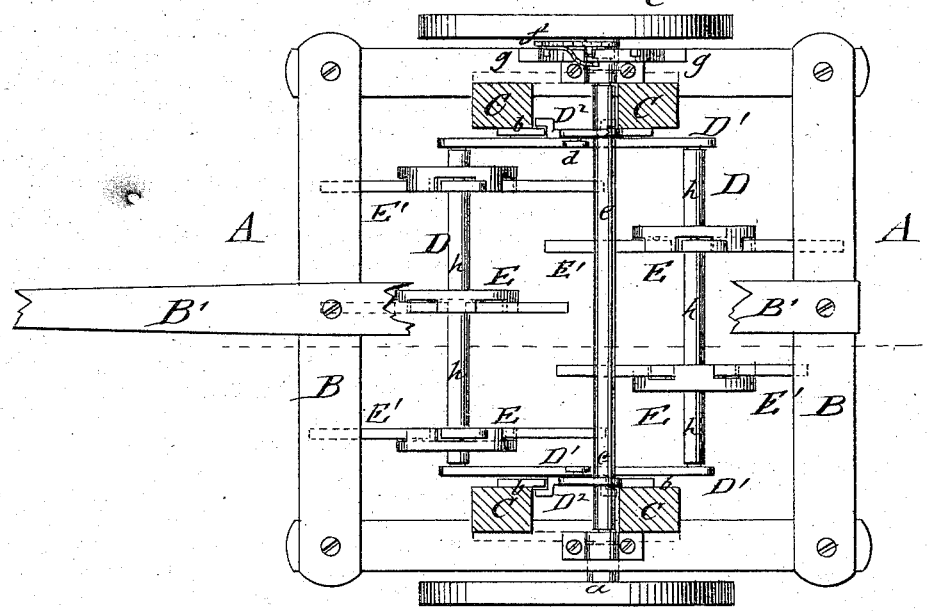

Be it known that we, HENRY VON PHUL, Jr., and JAMES MALLON, of Holly Wood, in the parish of East Baton Rouge and State of Louisiana, have invented a new and Improved Sugar-Cane-Stubble Digger and Cultivator, of which the following is a specification:

In the accompanying drawing, Figure 1 represents a vertical longitudinal section of our improved sugar-cane-stubble digger and cultivator, taken on the line $c\ c$, Fig. 2; and Fig. 2, a top view of the same, partly in section to show parts below.

Similar letters of reference indicate corresponding parts.

The object of our invention is to furnish for sugar-plantations and other agricultural purposes an improved stubble-digger and cultivator, which can be readily adjusted to the width of rows, and to different depths, being very effective in operation, and strong and durable in construction.

Our invention consists of rotating disks, with pivoted curved prongs or teeth, being placed loosely on lateral shafts, which turn in suitable side bearings, being adjustable therewith in vertical direction on the supporting-frame by crank-shaft, rack, and lever mechanism.

In the drawing, A represents the main supporting-frame of our stubble-digger, which consists of a rectangular horizontal frame, B, with tongue B′, attached to vertical side standards C, to which the driver's seat is applied at the top part, while the wheels or runners C′ are turning on short projecting axles $a$ at the lower part. Strong lateral shafts D turn loosely in side pieces $D^1$, which are firmly secured to slide-pieces $D^2$. Slides $D^2$ are raised and lowered in suitable guide-rails $b$ of standards C by connecting-rods $d$, lateral crank-shaft $e$, lever $f$, and arc-shaped rack $g$. A suitable number of rotating disks, E, are placed on each shaft D by means of washer-tubes $h$, and provided with notched side flanges $i$ at the circumference, in which the curved digger-teeth or prongs E′ swing. Teeth E′ are pivoted to the disks and extended to suitable length beyond the circumference of the disks, the notched flanges of the same defining the extent of swinging motion, and forcing them into the ground.

The digger-teeth are forced back as they enter the ground, loosening the stubbles and breaking the ground. The rotating diggers may be shifted on the shafts to any desired width by applying washers to suit, and thereby the machine employed for digging on the rows on each side. The teeth are flexible and require comparatively little weight to force them into the ground. The depth to which the diggers penetrate is regulated by the lever and rack arrangement, as they are thereby raised or lowered, as required.

A machine constructed with seven disks, each with seven teeth, may be operated by two horses, though any number of diggers can be placed on a machine by enlarging the size and strength of the same.

Having thus described our invention, we claim as new and desire to secure by Letters Patent—

1. In a sugar-cane-stubble digger, the curved teeth E′, the disks E, having enlarged notches or slots in their periphery, and the revolving shafts D, said disks being arranged alternating in position on the shafts, as shown and desired.

2. The combination of the digging mechanism formed of the teeth E′, disks E, and shafts D, the sliding blocks $a$, guides $b$, link $d$, crank-shaft $e$, lever $f$, and curved notched rack $g$, as shown and described, whereby the digger can be adjusted to and held at any desired height.

HENRY VON PHUL, JR.
JAMES MALLON.

Witnesses:
LEON JASTREMSKI,
T. B. HILLEN.